March 26, 1968     M. G. PALMER     3,375,074
MANUFACTURE OF PHOSPHINE
Filed Jan. 10, 1962
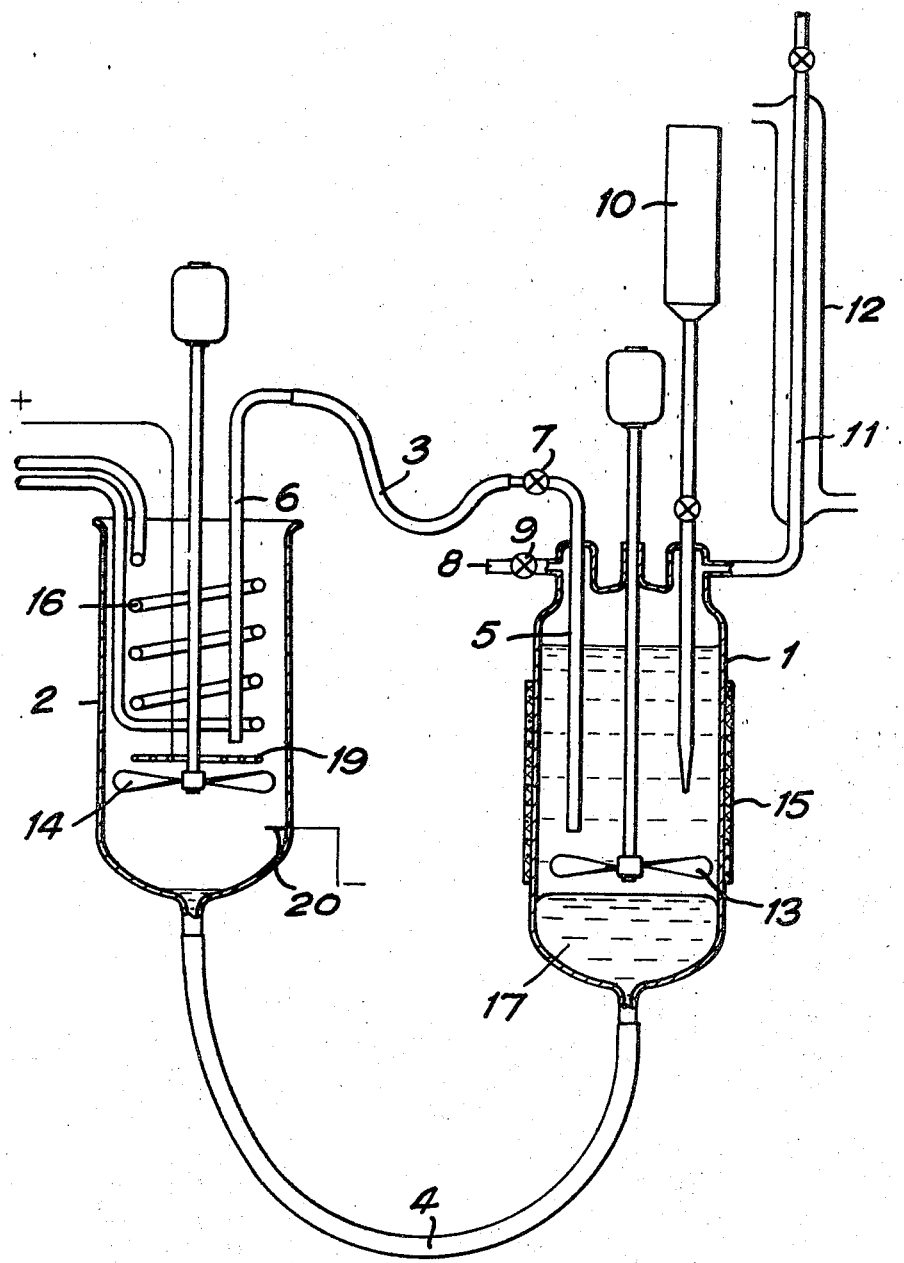
INVENTOR
Malcolm G. Palmer
By Herbert H. Goodman
ATTORNEY

United States Patent Office 3,375,074
Patented Mar. 26, 1968

3,375,074
MANUFACTURE OF PHOSPHINE
Malcolm George Palmer, Lakedown, near Kidderminster, England, assignor to Hooker Chemical Corporation, Niagara Falls, N.Y., a corporation of New York
Filed Jan. 10, 1962, Ser. No. 165,729
Claims priority, application Great Britain, Jan. 19, 1961, 2,209/61
5 Claims. (Cl. 23—204)

This invention consists in a process for the manufacture of phosphine which comprises bringing white phosphorus into contact with an amalgam of mercury with zinc or cadmium in an acid aqueous medium.

While the invention may be carried out with an amalgam of zinc or cadmium, zinc amalgam is preferred and gives an excellent yield of phosphine. The proportion of zinc or cadmium in the amalgam may be high. e.g., up to 70% in the case of zinc but amalgams containing a relatively small proportion of zinc or cadmium are preferred, such as, for example, less than 5%.

To produce the acid medium, any acid may be used which, under the conditions of the reaction, does not significantly react with either phosphorus or phosphine. Suitable acids are, for example, sulphuric, acetic, hydrochloric, phosphorus or phosphoric acid. The concentration of the acid in the aqueous medium is not critical, but the more concentrated the acid, the faster the reaction. The reaction will proceed at a pH as high as 5, to which concentration the acid may be allowed to fall during the course of the reaction. It is, however, preferred to use, at all events initially, a considerably higher concentration in the range 1 to 10 moles per litre. The optimum concentration of acid in any particular case depends on the solubility of the reaction products, the composition of the amalgam and the specific gravity of the acid. The relevance of this last factor is due to the fact that it is usually desirable for the specific gravity of the acid medium to be less than that of the white phosphorus in order that the latter may sink to the level of the amalgam, although in one process hereinafter described, the reverse relationship is required.

The reaction takes place at the interface of the amalgam, phosphorus and acid. It is advantageous to arrange that the phosphorus is present in a thin layer on the surface of the amalgam. This may be brought about in one of two ways: The phosphorus may be introduced into the acid a drop at a time as it is consumed. Each drop sinks until it reaches the surface of the amalgam whereupon it spreads in a thin layer over the surface by surface tension. Alternatively the reaction may be carried out in a tower containing the acid medium which is of sufficient specific gravity to enable a layer of white phosphorus to float upon it. The amalgam is allowed to fall, a drop at a time, through the phosphorus, where it picks up a layer of phosphorus so that the reaction takes place as the drop falls through the acid column. Preferably a column of dilute acid floats on the phosphorus layer or column, for cleaning the amalgam before it reaches the phosphorus.

The higher the temperature, the faster the reaction and the latter may advantageously be carried out under reflux, so that some degree of agitation is imparted to the reactants. It is in general advantageous to stir the reactants to keep the amalgam-phosphorus-aqueous acid interface mobile, but the stirring should not be so vigorous as to disperse the amalgam throughout the acid. Such a dispersion in the presence of phosphorus takes the form of a black emulsion which is only slightly reactive. Refluxing and stirring are not applicable to the tower process described above.

As the phosphine is evolved, the zinc or cadmium is dissolved in the acid medium. The metal content of the amalgam may be replenished either by replacing the mercury or depleted amalgam with fresh amalgam separately prepared, or by addition of the other metal to the mercury or depleted amalgam within the reaction vessel during or following the reaction. Thus, for example, zinc in granulated or lump form may be dropped through the acid into the mercury or depleted amalgam. These lumps float on the surface of the mercury but are prevented from coming into contact with the acid by a layer of mercury which spreads over the exposed surface of the lump by surface tension.

If desired, the metal may be recovered from the solution, for example by electrolysis. It is convenient to use a mercury cathode, so that the amalgam may be reconstituted. By this means the process can be operated continuously. Thus, mercury is withdrawn from the reaction vessel as it is formed (i.e. as the zinc or cadmium is used up), and is conveyed to an electrolytic cell in which it forms the cathode. The aqueous medium is also withdrawn from the vessel at the appropriate rate and is caused to flow into the cell to form the electrolyte. The mercury flows through the cell, for example over an inert supporting member, and leaves the cell in the form of an amalgam with the metal deposited from the electrolyte. This amalgam is conveyed back to the reaction vessel.

Apparatus for carrying out the invention as a semicontinuous process is described by way of example with reference to the accompanying drawing.

In the drawing, 1 represents the reaction vessel and 2 the electrolysis vessel. These vessels are connected by flexible tubes 3 and 4, the tube 4 connecting their lower ends and the tube 3 being connected with rigid tubes 5 and 6 to form a siphon. The tube 5 is provided with a control valve 7. The vessel 1 has a further connection 8 controlled by a valve 9, a dropping funnel 10 and an outlet pipe 11 surrounded by a water condenser 12. Each vessel has a stirrer 13 and 14 respectively, and vessel 1 has an electric heater 15 and vessel 2 a cooling coil 16. Vessel 2 has a spiral platinum anode 19 and a wire cathode connection 20.

To commence operation, vessel 2 is held at a higher level than vessel 1 as shown in the drawing, the means for holding and adjusting the heights of the vessels not, however, being shown. The amalgam is poured into the vessel 2 and flows through tube 4 into vessel 1, as shown at 17. Vessel 1 is then purged with an inert gas. The acid medium is then poured into vessel 2, a suction pump is connected with tube 8, the valves 7 and 9 are opened and the outlet 11 is momentarily closed. Acid is drawn into the siphon 6, 5, 3 and then siphons over into vessel 1, the valve 9 being meanwhile closed. When the siphoning is completed, the valve 7 is closed. White phosphorus in the dropping funnel 10 is kept molten by a heater (not shown) and is allowed to fall dropwise into the acid. The acid is maintained at refluxing temperature, and gas containing phosphine is evolved through outlet 11.

When the output of phosphine has dropped to a predetermined rate, the vessel 2 is lowered so that the depleted amalgam flows into it through tube 4. The siphon is filled by connecting nitrogen under pressure to connection 8, valves 7 and 9 being now opened, and outlet 11 being momentarily closed. When the acid has siphoned over into the vessel 2, a positive potential is applied to anode 19 and a negative potential to cathode connection 20 which is now covered by the amalgam. Electrolysis is carried out at 200 milliamps per cm.$^2$ until hydrogen begins to be evolved at the cathode, whereupon the vessel 2 is again raised and the cycle of operations recommenced.

EXAMPLES 1–4

An amalgam was prepared by bringing together zinc and mercury under 50 mls. distilled water while refluxing. 100 mls. of acid were then added, followed by white phosphorus. The mixture was maintained under reflux and well stirred, and a gas consisting of a mixture of phosphine and hydrogen evolved.

TABLE I

| Example | 1 | 2 | 3 | 4 |
|---|---|---|---|---|
| Metal and quantity | Zinc, 3.4084 | Zinc, 3.1380 | Zinc, 3.2902 | Zinc, 3.5067 |
| Quantity of mercury (gms.) | 64.9892 | 64.5986 | 64.3701 | 65.4282 |
| Acid and concentration (molar) | $H_3PO_3$, 6M | $H_3PO_3$ 6M | HCl, 9M | $H_2SO_4$, 3M |
| Quantity (gms.) of phosphorus $P_4$ | 0.969 | 0.893 | 0.936 | 0.997 |
| Quantity of $PH_3$ and $H_2$ evolved (litres) | 0.792 | 0.737 | 0.854 | 0.798 |
| Percentage $PH_3$ | 95 | 94 | 85 | 97 |

EXAMPLES 5-7

An amalgam was prepared by electrolysing a solution of zinc sulphate or cadmium sulphate in 200 mls. distilled water with a mercury cathode. Electrolysis was carried out until all the zinc or cadmium ions had been removed from solution. The amalgam was then washed and added to 50 mls. of distilled water. The water was heated under reflux and then 100 mls. of acid were added, followed by phosphorus. The mixture was maintained under reflux and well stirred, and a gas consisting of a mixture of pohsphine and hydrogen was evolved.

TABLE II

| Example | 5 | 6 | 7 |
|---|---|---|---|
| Metal salt and quantity (gms.) | $ZnSO_4.7H_2O$, 57.3 | $ZnSO_4.7H_2O$, 59.9 | $3CdSO_4.8H_2O$, 33.4 |
| Weight of mercury cathode (gms.) | 131.6760 | 132.3812 | 132.8252 |
| Acid and concentration (molar) | $H_2SO_4$, 3M | Acetic acid, 3.5M | HCl, 6M |
| Quantity (gms.) of phosphorus $P_4$ | 3.71 | 3.87 | 2.7 |
| Quantity of $PH_3$ and $H_2$ evolved (litres) | 2.96 | 3.12 | 20 |
| Percentage $PH_3$ | 97 | 96 | |

In the case of Example 6, traces of solid hydrides equivalent to 10 mgms. of $P_4$ were deposited on the walls of the apparatus.

EXAMPLE 8

6.7685 gms. of granulated zinc was added to 473.3 gms. of mercury in 224 mls. of refluxing 6 molar orthophosphoric acid in the presence of 2.3 gms. of white phosphorus, the medium being well stirred. The area of the mercury surface when static was 44 cm.$^2$. A gas containing 99.5% of phosphine on a dry weight/volume basis was evolved.

What I claim is:

1. A process for preparing phosphine comprising reacting white phosphorus, an amalgam of mercury and a metal selected from the group consisting of zinc and cadmium, and a composition consisting essentially of an aqueous solution of an acid at a pH ranging up to pH 5, said reacting taking place at an interface of said aqueous solution of acid, white phosphorus and amalgam which forms a layer beneath said aqueous solution of acid, said aqueous solution of acid further having a specific gravity less than that of said white phosphorus, and in which said reacting includes dropping said white phosphorus, a drop at a time, through said aqueous solution of acid, whereby it drops to the bottom of said aqueous solution of acid and reaches the surface of the amalgam and forms a thin layer thereon.

2. A process in accordance with claim 1, wherein the acid is selected from the group consisting of sulphuric, acetic, hydrochloric, phosphorous and phosphoric acids, wherein the concentration of the acid in the aqueous medium is in the range of 1 to 10 moles per liter, and wherein the reaction is conducted at reflux.

3. A process for preparing phosphine comprising reacting white phosphorus, an amalgam of mercury and a metal selected from the group consisting of zinc and cadmium, and a composition consisting essentially of an aqueous solution of an acid at a pH ranging up to pH 5, said reacting taking place at an interface of said aqueous solution of an acid, amalgam and white phosphorus, said aqueous solution of an acid having a specific gravity greater than that of said white phosphorus, and in which said reacting includes floating said white phosphorus on said aqueous solution of an acid, and dropping said amalgam, a drop at a time, thru the layer of white phosphorus, whereby it picks up a layer of phosphorus so that the reacting occurs as said drop falls thru said aqueous solution of acid.

4. A process in accordance with claim 3 wherein the acid is selected from the group consisting of sulphuric, acetic, hydrochloric, phosphorous and phosphoric acids, wherein the concentration of the acid in the aqueous medium is in the range of 1 to 10 mols per liter, and wherein the reaction is conducted at reflux.

5. An apparatus for the preparation of phosphine comprising (1) a reaction vessel, (2) an electrolytic cell in which a depleted amalgam is a cathode of said electrolytic cell, (3) a conduit means including at least two separate conduits comprising a first flexible conduit and a second flexible conduit, said first conduit being connected to substantially a lower part of each of said reaction vessel and said electrolytic cell, said second conduit being connected to said electrolytic cell and to a substantially upper part of said reaction vessel, said second conduit further including a valve means associated therewith, whereby it can function as a siphon, (4) a means for electrolyzing said electrolytic cell, and (5) a means for adding white phosphorus to said reaction vessel.

References Cited

UNITED STATES PATENTS

| | | | |
|---|---|---|---|
| 2,938,771 | 5/1960 | Avedikian | 23—116 |
| 1,712,952 | 5/1929 | Creighton | 204—220 |
| 2,876,192 | 3/1959 | Wurbs | 204—220 |
| 2,952,604 | 9/1960 | De Nora | 204—220 |
| 2,469,879 | 5/1949 | Hurd | 23—204 |
| 3,019,087 | 1/1962 | Jacob et al. | 23—204 |

FOREIGN PATENTS

776,629 6/1957 Great Britain.

OTHER REFERENCES

Gmelin-Kraut, "Handbuch der Anorganischen Chemie," 7th edition, 1911, vol. I, part III, p. 64.

Pascal, "Noveau Triate De Chimie Minerale," 1958, vol. XI, pp. 550–551.

Mellor, Comprehensive Treatise on Inorganic and Theoretical Chemistry, vol. 8, pp. 806, 813 (1928).

MILTON WEISSMAN, *Primary Examiner.*

MAURICE A. BRINDISI, *Examiner.*

M. N. MELLER, R. DAVIDSON, *Assistant Examiners.*